Figures 1, 2:
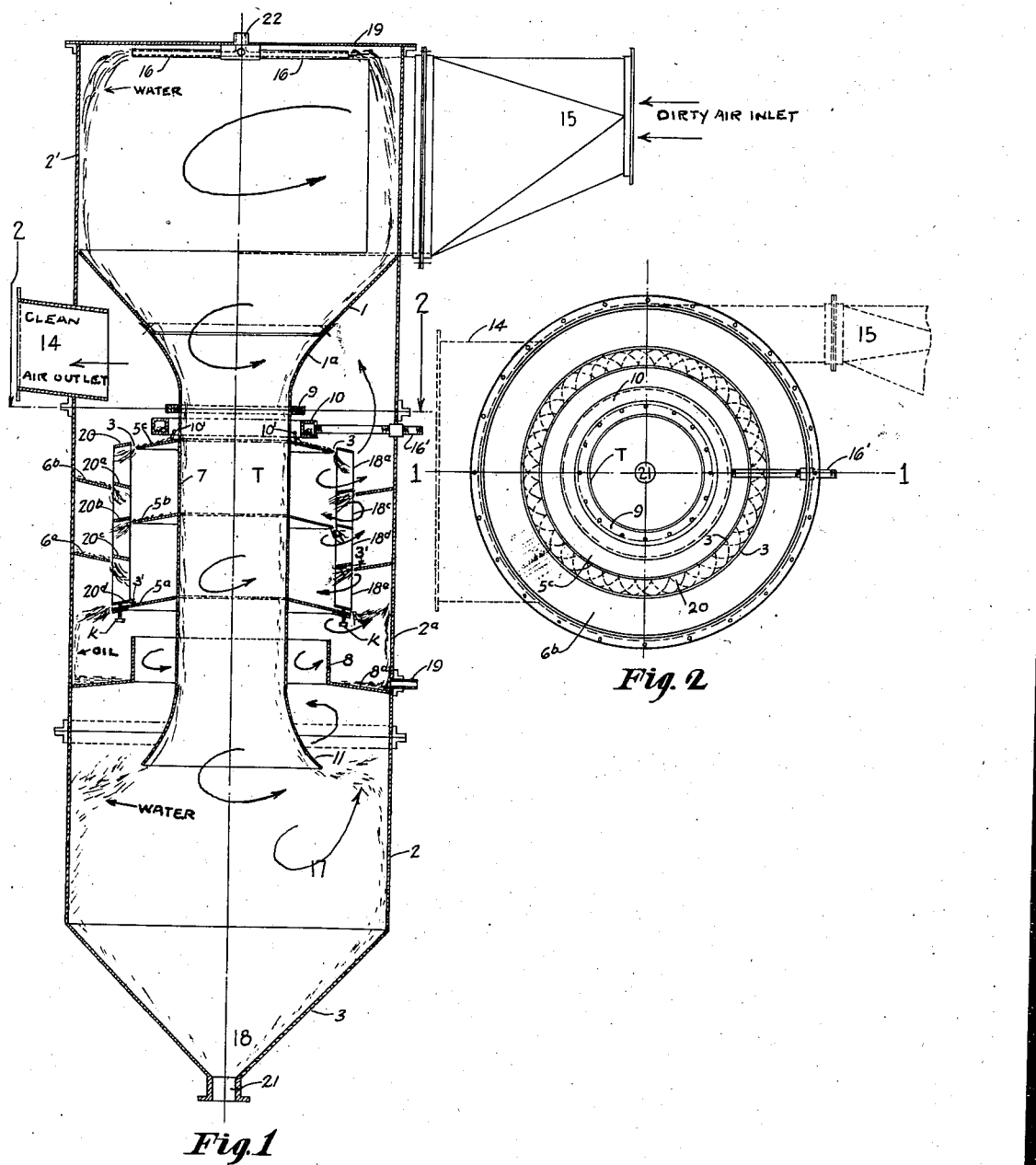

Oct. 14, 1941.  E. F. FISHER  2,259,032

GAS WASHER

Filed Feb. 9, 1939

INVENTOR.
Ernest F. Fisher

Patented Oct. 14, 1941

2,259,032

UNITED STATES PATENT OFFICE 2,259,032

GAS WASHER

Ernest F. Fisher, Boston, Mass.

Application February 9, 1939, Serial No. 255,388

8 Claims. (Cl. 261—18)

This invention relates to improvements in columns for the treatment of vapor and gases with water, oil or other liquids for the purpose of removing dust, impurities and other solids from the gases, vapor or air or the absorption of one vapor by another by contact with a liquid or vapor, wherein the effect is attained by the scrubbing action of water, other liquid or a vapor, at high speed under the influence of centrifugal force, whereby the particles are caused to impinge upon wet surfaces located in the path of the spiralling air, gas or vapor.

The invention consists in the novel features of construction more fully set forth in the specifications and pointed out in the claims, and is similar to the structures shown and described in my copending application Serial No. 251,751 and Serial No. 253,551.

The principal object of my invention is to overcome the difficulty inherent in wetting very fine dusts of microscopic size in that these dusts are water repellant and are not easily wetted by water which is commonly used as the contact liquid. Therefore I propose to use oil or some other suitable liquid which has the property of wetting such dusts readily, and using a cheap liquid such as water for wetting the coarser and heavier easily wetted particles. The oil or other liquid that I propose to use to wet the more water repellant fine dust particles, is comparatively costly, making it desirable to re-circulate this liquid and not mix it with the less costly liquid used for wetting the heavier particles, and which can be wasted if need be.

Another object of my invention is to more effectively wet the blades or vanes through which the dust laden air swirls and against which the dust particles impinge and to more effectively wet and wash the walls of the enclosing chamber and cooperating baffles so that particles of dust that impinge thereon may be washed off and the surfaces kept clean and the dust washed down with the downcoming liquid.

Another object of my invention is to provide a system of guide vanes, impingement plates, baffles and enclosing walls which imposes the least resistance to the flow of air as it swirls in a continuous path.

Another object of my invention is to provide a system of guide and impingement vanes of a unitary structure which is independent of coordinating baffles and which can be withdrawn without hindrance from the coordinating baffles or other structural elements of the housing, and to provide a structure which will facilitate fabrication and assembly and thus lower the cost of this equipment to the consumer.

Other advantages of my invention will be better apparent from a detailed description in connection with the accompanying drawing in which Figure 1 is a vertical cross section taken on line 1—1 of Figure 2. Figure 2 is a transverse section of Figure 1 taken on line 2—2 and shows in plan view the dirty air inlet 15, clean air outlet 14, both shown by dotted lines; also, Figure 2 shows plan views of flanges 9 supporting axial tube assembly T, oil splash ring 10 encircling tube T with supply pipe 16¹ connected, tube baffle ring 5ᶜ and blade ring 20 with the clearances 3 provided to permit withdrawing the bladed assembly.

The unit consists of three circular sections, namely; the upper cyclone separator section 2¹ which has a conical bottom 1 terminating in the axial tube T and to which it is attached by the flanges 9 (this axial tube T communicates with the lowermost section 2), the intermediate section 2ᵃ which is provided with a system of baffles and vanes and a liquid retaining well formed by walls 8 and 8ᵃ, and a lowermost section 2 provided with a hopper bottom 3 and terminating in the sludge outlet 21 from the sludge chamber 18. The top section 2¹ is provided with a cover 19, a tangential air inlet 15 and a water distributing means 22 and the cooperating distributing pipes 16 together with the clean air outlet 14.

In operation dust laden air enters the topmost chamber 2¹ through the tangential inlet 15 which starts the air swirling. This swirling air throws the water issuing from pipes 16 to the wall of chamber 2¹ which it copiously wets. Heavy dust is thrown out from the swirling air stream and impinge on the wet wall of chamber 2¹ and is carried down with the water through axial tube T to the lowermost chamber 2. The air and water in chamber 2¹ swirl at high velocity down the axial tube T thus wetting the walls of tube T. The high angular velocity of air in tube T causes some of the fine dust to which has been imparted considerable centrifugal force, to impinge on wall of tube T and is washed down by the swirling water into chamber 2.

As the air swirls in chamber 17 it is freed of all the heavier dust particles and the more wettable fine dust particles. Only the extremely fine water repellant dust particles remain in the air stream. These particles are carried upward by the spiralling air through the bladed sections 18ᵉ, 18ᵈ, 18ᶜ and 18ᵃ and meet the downcoming oil or other liquid which is distributed to the topmost baffle ring 5ᶜ by the circular chamber 10 through a series of holes 10¹. This oil falls off the edge of baffle ring 6ᶜ through vertical clearance 3¹, the clearance 3 being merely to facilitate withdrawing the assembly and should be very small to avoid by-passing air from around the vanes.

It will be noted that the bladed assembly 18ᵉ, 18ᵈ, 18ᶜ and 18ª with the blade rings 20ᵈ, 20ᶜ, 20ᵇ, 20ª and 20, is supported by lower-most baffle ring 6ª by means of the adjusting screws k which can raise or lower the blade assembly thus increasing or decreasing the vertical clearance 3¹ between the blade rings 20 and the baffle rings 5 and 6. As before stated, it is desirable to keep the annular clearance 3 as small as possible so that no air will by-pass though this clearance instead of passing through the vanes or blades, thus permitting the sheet of oil falling off the edges of baffles 5 and 6 to fall directly on the blades 18 into the air stream passing between the blades. The vertical clearance 3¹ should be just sufficient to permit the sheet of oil to flow under the blade rings 20 and to effect an oil seal at this point.

It will be noted that the orifice 1ª connecting the conical bottom 1 with the upper part of axial tube T, is well rounded so as to reduce materially the resistance to the flow of air and water at this point and similarly the well rounded orifice 11 reduces the resistance due to change in direction at this point.

The vertical clearances 3¹ permit the sheet of oil that falls off of edges of baffle plates 5 and 6, to fall directly into the path of the air swirling through the vanes thus permitting the vanes to be wet copiously, as well as the ajoining walls of the axial tube T and walls of chamber 2ª. The vanes 18 in each horizontal set are curved and positioned at an angle to the vanes in the adjacent set as shown in dotted lines in plan view Figure 2. This guides the air spirally upward first inwardly through the vanes 18ᵉ toward the wall of axial tube T and then outwardly through vanes 18ᵈ to the wall of chamber 2ª, and thence upwardly in a continuously spiral path of varying diameter until it reaches the clean air outlet 14.

The oil with its entrained dust or sludge falls into the annular well formed by walls 8 and 8ª and is drained through pipe 19 to a sludge tank not shown, where the oil can be separated from the sludge and re-circulated by a pump not shown. The heavy dust that has been precipitated in the preliminary washing chamber 2¹ flows down the axial tube T into the sludge chamber 18 of bottom section 2 where it is discharged through outlet 21.

The oil for precipitating the fine water repellant dust is thus kept separate from the water used in precipitating the heavy wettable dust.

Having particularly described my invention and its operation, I declare what I claim is:

1. In a gas cleaning column provided with a tangential inlet at the top and a partition within said column dividing it into an upper and lower compartment, an outlet for cleaned gases provided in said column below said partition, an opening in said partition, a vertical tube depending from said opening, a substantially horizontal annular upper baffle attached to and surrounding said tube, a substantially horizontal annular lower baffle attached to the inner wall of the column below said outlet and below said upper baffle, a cylindrical assembly comprising a blade ring and a plurality of vertically disposed swirl-producing vanes supported within the column and extending between said baffles, the diameter of said assembly being greater than the outer diameter of the upper baffle, said assembly being adjustable vertically to regulate the space between said blade ring and said upper baffle, said blade ring being positioned on a level with or above said upper baffle, and means for supplying liquid to the surface of the upper baffle.

2. A gas cleaning column provided with a tangential inlet at the top and a partition within said column dividing it into an upper and lower compartment, an outlet for cleaned gases provided in said column below said partition, an opening in said partition, a vertical tube depending from said opening, a substantially horizontal lower annular baffle attached to and surrounding said tube, a substantially horizontal annular upper baffle attached to the inner wall of the column below said outlet and above said lower baffle, a cylindrical assembly comprising a blade ring and a plurality of vertically disposed swirl-producing vanes supported within the column and extending between said baffles, the diameter of the assembly being less than the inner diameter of the upper baffle, said assembly being adjustable vertically to regulate the space between said blade ring and said upper baffle, said blade ring being positioned on a level with or above said upper baffle, and means for supplying liquid to the surface of the upper baffle.

3. An annular scrubbing chamber of a gas cleaning apparatus comprising in combination a column provided with an inlet at the top, a substantially vertical tube depending from said inlet, an outlet provided in the wall of the column, a substantially annular upper baffle attached to and surrounding said tube, a substantially annular lower baffle attached to the inner wall of the column below said outlet and below said upper baffle, a cylindrical assembly comprising a blade ring and a plurality of vertically disposed swirl-producing vanes supported within the column and extending between said baffles, the diameter of said assembly being greater than the outer diameter of the upper baffle, said assembly being adjustable vertically to regulate the space between said blade ring and said upper baffle, said blade ring being positioned on a level with or above said upper baffle, and means for supplying liquid to the surface of the upper baffle.

4. An annular scrubbing chamber of a gas cleaning apparatus comprising in combination a column provided with an inlet at the top, a substantially vertical tube depending from said inlet, an outlet provided in the wall of the column, a substantially annular lower baffle attached to and surrounding said tube, a substantially annular upper baffle attached to the inner wall of the column below said outlet and above said lower baffle, a cylindrical assembly comprising a blade ring and a plurality of vertically disposed swirl-producing vanes supported within the column and extending between said baffles, the diameter of said assembly being less than the inner diameter of said upper baffle, said assembly being adjustable vertically to regulate the space between said blade ring and said upper baffle, said blade ring being positioned on a level with or above said upper baffle, and means for supplying liquid to the surface of the upper baffle.

5. A gas cleaning column comprising in combination a cyclone separator at the top, an inlet in said cyclone separator, an opening in the bottom of said separator, a substantially vertical tube depending from said outlet, an outlet for cleaned gases in the wall of said column below said separator, a substantially horizontal annular upper baffle attached to and surrounding said tube, a substantially horizontal annular lower baffle attached to the inner wall of the column below said outlet and below said upper baffle, a cylindrical assembly comprising a blade ring and a plurality of vertically disposed swirl-producing vanes supported within the column and extending between said baffles, the diameter of said assembly being greater than the outer diameter of the upper baffle, said assembly being adjustable vertically to regulate the space between said blade ring and said upper baffle, said blade ring being positioned on a level with or above said upper baffle, means for supplying water to the streams of gases in the cyclone separator, means to supply oil to the surface of the upper baffle, and means to collect for recycling, said oil after draining from said baxffles and vanes.

6. A gas cleaning column comprising in combination a cyclone separator at the top, an inlet in said cyclone separator, an opening in the bottom of said separator, a substantially vertical tube depending from said outlet, an outlet for cleaned gases in the wall of said column below said separator, a substantially horizontal annular lower baffle attached to and surrounding said tube, a substantially horizontal annular upper baffle attached to the inner wall of the column below said outlet and above said lower baffle, a cylindrical assembly comprising a blade ring and a plurality of vertically disposed swirl-producing vanes supported within the column and extending between said baffles, the diameter of said assembly being less than the inner diameter of the upper baffle, said assembly being adjustable vertically to regulate the space between said blade ring and said upper baffle, said blade ring being positioned on a level with or above said upper baffle, means for supplying water to the stream of gases in the cyclone separator, means to supply oil to the surface of the upper baffle, and means to collect for recycling said oil after draining from said baffles and vanes.

7. A gas cleaning column comprising in combination a cyclone separator at the top, an inlet in said cyclone separator, an opening in the bottom of said separator, a substantially vertical tube depending from said outlet, an outlet for cleaned gases in the wall of the column below said separator, a substantially horizontal annular upper baffle attached to and surrounding said tube, a substantially horizontal annular lower baffle attached to the inner wall of the column below said outlet and below said upper baffle, a cylindrical assembly comprising a blade ring and a plurality of vertically disposed swirl-producing vanes supported within the column and extending between said baffles, the diameter of said assembly being greater than the outer diameter of the upper baffle, said blade ring being positioned on a level with or above said upper baffle, means for supplying water to the stream of gases in the cyclone separator, means to supply oil to the surface of the upper baffle, and means to collect for recycling said oil after draining from said baffles and vanes.

8. A gas cleaning column comprising in combination a cyclone separator at the top, an inlet in said cyclone separator, an opening in the bottom of said separator, a substantially vertical tube depending from said outlet, an outlet for cleaned gases in the wall of said column below said separator, a substantially horizontal annular lower baffle attached to and surrounding said tube, a substantially horizontal annular upper baffle attached to the inner wall of the column below said outlet and above said lower baffle, a cylindrical assembly comprising a blade ring and a plurality of swirl-producing vanes supported within the column and extending between said baffles, the diameter of said assembly being less than the inner diameter of the upper baffle, said blade ring being positioned on a level with or above said upper baffle, means for supplying water to the stream of gases in the cyclone separator, means to supply oil to the surface of the upper baffle, and means to collect for recycling said oil after draining from said baffles and vanes.

ERNEST F. FISHER.